United States Patent
Fujine et al.

(10) Patent No.: US 8,860,746 B2
(45) Date of Patent: Oct. 14, 2014

(54) VIDEO DISPLAY DEVICE

(75) Inventors: Toshiyuki Fujine, Osaka (JP); Takashi Kanda, Osaka (JP); Toshiyuki Gotoh, Osaka (JP); Naoko Kondoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 226 days.

(21) Appl. No.: 13/057,309
(22) PCT Filed: Aug. 27, 2009
(86) PCT No.: PCT/JP2009/064916
§ 371 (c)(1),
(2), (4) Date: Mar. 22, 2011
(87) PCT Pub. No.: WO2010/024309
PCT Pub. Date: Mar. 4, 2010

(65) Prior Publication Data

US 2011/0199541 A1    Aug. 18, 2011

(30) Foreign Application Priority Data

Aug. 29, 2008  (JP) ................................ 2008-220879

(51) Int. Cl.
*G09G 5/02* (2006.01)
*H04N 9/64* (2006.01)
*G09G 3/36* (2006.01)
*G09G 3/34* (2006.01)

(52) U.S. Cl.
CPC ........... *H04N 9/643* (2013.01); *G06G 2340/06* (2013.01); *G09P 2320/064* (2013.01); *G09G 3/3611* (2013.01); *G09G 3/342* (2013.01); *G09G 2320/0242* (2013.01); *G09G 2320/0646* (2013.01); *G09G 5/02* (2013.01)
USPC .......................................... 345/590; 345/589

(58) Field of Classification Search
USPC ................................. 345/589, 590
See application file for complete search history.

(56) References Cited

U.S. PATENT DOCUMENTS

2002/0012073 A1  1/2002  Kumakura et al.
2004/0239814 A1*  12/2004  Hirashima et al. ............ 348/649
2007/0085856 A1*  4/2007  Wang et al. .................... 345/591
2007/0222729 A1  9/2007  Nishiyama et al.
2008/0231641 A1  9/2008  Miyashita
2008/0266314 A1*  10/2008  Butterworth ................... 345/590

FOREIGN PATENT DOCUMENTS

CN      101253545 B     9/2010
EP      1 482 743 A2    12/2004

(Continued)

OTHER PUBLICATIONS

English computer translation (provided by the JPO) of JP-2007-286120-A dated Nov. 1, 2007.

*Primary Examiner* — Xiao Wu
*Assistant Examiner* — Scott E Sonners
(74) *Attorney, Agent, or Firm* — Birch, Stewart, Kolasch & Birch, LLP

(57) ABSTRACT

When conducting video display with a wide color gamut display based on a video signal conforming to a standard (sRGB standard and the like) having a color reproduction range narrower than that of the wide color gamut display, the video processing circuit 2 corrects a color in a prescribed correction target color range partly including a red hue reference range as a center part in the color range of an equal hue from achromatic colors having the lowest saturation to red having the highest saturation in an expanded color reproduction range but not including red having the highest saturation in the expanded color reproduction range, so that the hue may change to a hue akin to yellow in the expanded color reproduction range. In so doing, the hue in the red hue reference range changes to red hue in the color reproduction range conforming to the sRBG standard. Furthermore, the hue change ratio into the hue akin to yellow becomes smaller in a color having a long distance from the red hue reference range in the expanded color reproduction range than a color having a distance close thereto. As a result, the wide color gamut display displayable of bright red having a high saturation can be fully utilized, while at the same time solving the problem of hue displacement in displaying red having an intermediate saturation.

4 Claims, 6 Drawing Sheets

(56) References Cited

FOREIGN PATENT DOCUMENTS

| | | |
|---|---|---|
| JP | 2002-44677 A | 2/2002 |
| JP | 2004-356930 A | 12/2004 |
| JP | 2007-256488 A | 10/2007 |
| JP | 2007-286120 A | 11/2007 |
| WO | WO 2008/062355 A1 | 5/2008 |

\* cited by examiner

VIDEO DISPLAY DEVICE

FIELD OF THE INVENTION

The present invention relates to a video display device comprising a wide color gamut display having a color reproduction range wider than that of the sRGB standard.

BACKGROUND ART

A conventional and ordinary video display device comprises a display (hereinafter, referred to as "standard color gamut display") displayable of a video in colors in a color reproduction range conforming to the sRGB (standard RGB) standard, a national standard of IEC (International Electrotechnical Commission). In contrast, a recent video display device, particularly a liquid crystal display device, realizes a higher quality picture, having a wider representable range of colors than the conventional device.

For example, when a video signal conforming to the sRGB standard is input, and when video display is conducted by directly using the video signal, a liquid crystal display device, having; a backlight that has an LED of a high color purity in light emission colors as a light source and, a liquid crystal panel (an example of a display) illuminated by the backlight, displays video in colors in a color reproduction range (hereinafter, referred to as "expanded color reproduction range") wider than that of the sRGB standard. Such a display (hereinafter, referred to as "wide color gamut display") is displayable of brighter (higher saturation) colors than the standard color gamut display.

FIG. 2 shows a case when conducting video display based on a video signal conforming to the sRGB standard. The figure shows, on a chromaticity diagram, a color reproduction range CS1 displayed on the standard color gamut display and a color reproduction range CS2 displayed on the wide color gamut display.

In FIG. 2, the positions of three points P1r, P1g, and P1b in the color reproduction range CS1 of the standard color gamut display show red, green, and blue of the highest saturation in the color reproduction range CS1 respectively. Similarly, the positions of three points P2r, P2g, and P2b in the color reproduction range CS2 of the wide color gamut display show red, green, and blue of the highest saturation in the color reproduction range CS2 respectively.

As shown in FIG. 2, the color reproduction range CS2 is broader than the color reproduction range CS1, and the wide color gamut display is therefore displayable of colors having the saturation higher than that of the standard color gamut display.

And also, in FIG. 2, a straight line L1r (an equal hue line of red) is shown with a thick dash line that represents a color range of an equal hue from achromatic colors (position of a point Pw) of the lowest saturation to red (position of a point P1r) of the highest saturation in the standard color reproduction range CS1. Similarly, a straight line L2r (an equal hue line of red) is shown with a thick dash line that represents a color range of an equal hue from achromatic colors (position of a point Pw) of the lowest saturation to red (position of a point P2r) of the highest saturation in the expanded color reproduction range CS2.

Furthermore, FIG. 2 shows solid lines: L0r, L0g, L0b, L0c, L0m, and L0y, for red, green, blue, cyan, magenta, and yellow, respectively that represent a color range of equal hues visually sensed as having the same hue from achromatic colors to each color (chromatic color). In short, the solid lines L0r, L0g, L0b, L0c, L0m, and L0y represent the equal hue lines of each color: red, green, blue, cyan, magenta, and yellow. The visually equal hue lines L0r, L0g, L0b, L0c, L0m, and L0y for each color shown in FIG. 2 are also described in the Nonpatent literature 1.

Here, the red hue is described.

FIG. 3 shows, in close-up, equal hue lines of red L1r and L2r in the standard color reproduction range CS1 and the expanded color reproduction range CS2 respectively and a visually equal hue line of red L0r.

As shown in FIG. 3, the visually equal hue line of red L0r has a shape curved in a direction having a convexed shape near the yellow hue.

The red equal hue line L1r in the standard color reproduction range CS1 is a straight line, however, closely resembles to the visually equal hue line of red L0r. Therefore, when video display based on a video signal conforming to the sRGB standard is conducted on the standard color gamut display, with respect to reddish video, a signal value of an equal hue is reproduced by colors having approximately the same hue from achromatic colors (position of the point Pw) to a color of the highest saturation (position of the point P1r). However, the color reproduction range CS1 of the standard color gamut display is narrow, and thus, the brightness for displaying red having a high saturation lacks. In addition, for a video signal conforming to the standards other than the sRGB standard (for example, sYCC standard), video display may be conducted by inputting the video signal to a display having the color reproduction range same as that of the standard, so that the red color of equal hue is displayed by a primary color.

Additionally, the red equal hue line L1r in the standard color reproduction range CS1 has red of the highest saturation (the position P2r) that closely resembles to the visual red of a high saturation.

Therefore, when video display based on a video signal conforming to the sRGB standard is conducted on the wide color gamut display, with respect to red having an extremely high saturation, the primary color the video signal indicates is reproduced highly brightly in the video.

Patent literature 1: Japanese Unexamined Patent Publication No. H08-130655

Nonpatent literature 1: G. Wyszecki, and W. S. Stiles, "Color Science: Concepts and Methods, Quantitative Data and Formulae", 2nd ed., New York, John Wiley & Sons Inc., 2000, p. 447

SUMMARY

Problem to be Solved by the Invention

However, the red equal hue line L1r in the standard color reproduction range CS1 is a straight line and, in the part of an intermediate saturation, has a great gap against the visually equal hue line of red L0r. Therefore, when video display based on a video signal conforming to the sRGB standard is conducted on the wide color gamut display, with respect to red having an intermediate saturation, the visual hue largely displaces from red of the highest saturation, causing magenta-tinged color to be displayed in the video (hereinafter, referred to as "problem of hue displacement").

And also, as can be seen from the Patent literature 1, color gamut compression processing may be executed to the video signal, so that the display colors of the wide color gamut display fall in from the color range of the expanded color reproduction range CS2 to the color range of the standard color reproduction range CS1.

However, executing the color gamut compression processing to the video signal causes a problem of not fully utilizing the wide color gamut display displayable of bright red having a high saturation. The above problem also occurs, when the color reproduction range of a standard to which an input video signal conforms is narrower than the color reproduction range of the wide color gamut display (the expanded color reproduction range CS2).

Accordingly, the present invention has been completed on the basis of the above circumstances, and its object is to provide a video display device for, when conducting video display with the wide color gamut display based on a video signal conforming to a standard having a color reproduction range narrower than that of the wide color gamut display, fully utilizing the wide color gamut display displayable of bright red having a high saturation, while at the same time solving the problem of hue displacement in displaying red having an intermediate saturation.

Means for Solving the Problem

To achieve the above object, a video display device according to the present invention comprises a wide color gamut display having an expanded color reproduction range as a color reproduction range wider than that of the sRGB standard and corrects an input video signal conforming to a standard (for example, the sRGB standard, the sYCC standard, and the like) having a color reproduction range narrower than the expanded color reproduction range, so as to input to the wide color gamut display. The video display device comprises components shown in the following (1).

(1) a correcting means for correcting a signal value of the input video signal showing a color in a predetermined correction target color range partly including a red hue reference range as a saturation portion of a center point in a color range of an equal hue ranging from achromatic colors having the lowest saturation to red having the highest saturation in the expanded color reproduction range or as a saturation portion of a central prescribed range and not including red having the highest saturation in the expanded color reproduction range, so that the hue of the signal value may change to a hue akin to yellow in the expanded color reproduction range. In that case, the correcting means corrects so that the hue of the red hue reference range may be changed into ranging from achromatic colors having the lowest saturation in the color reproduction range of a standard to which the input video signal conforms to the red hue having the highest saturation. And also, the signal correcting means corrects so that the hue change ratio into the hue akin to yellow may be smaller in a color having a long distance from the red hue reference range in the expanded color reproduction range than a color having a distance close thereto.

In addition, an example for a typical wide color gamut display is a liquid crystal panel illuminated by a backlight having an LED as a light source.

In addition, the red hue reference range is, for example, a portion of the saturation accounting for nearly one fifth of the center in the color range of an equal hue from achromatic colors having the lowest saturation to red having the highest saturation in the expanded color reproduction range.

The red hue reference range shows red having an intermediate saturation in the expanded color reproduction range.

The signal correcting means corrects a signal value of the red hue reference range in the input video signal to coincide with a signal value showing red having an intermediate saturation in the color reproduction range of a standard to which the input video signal conforms, so that its hue may change into a hue akin to yellow. This allows the display color of red having an intermediate saturation on the wide color gamut display to closely resemble to the display color of red having an intermediate saturation on the standard color gamut display, in short, the color on a visually equal hue line of red (L0r in FIGS. 2 and 3), and thereby solving the problem of hue displacement.

On the other hand, as for the input video signal, the signal correcting means does not correct the signal value of red having the highest saturation in the expanded color reproduction range, and, on the other hand, conducts hue correction so that the hue change ratio into the hue akin to yellow may be smaller in a color having a long distance from the red hue reference range in the expanded color reproduction range than a color having a distance close thereto. Therefore, before/after the signal value correction, the color continuity (gradation) can be ensured, while bright red having a high saturation is displayed as it is without receiving the color gamut compression. As a result, the wide color gamut display displayable of bright red having a high saturation can be fully utilized.

According to the present invention, when conducting video display with a wide color gamut display based on a video signal conforming to a standard (sRGB standard and the like) having a color reproduction range narrower than that of the wide color gamut display, the wide color gamut display displayable of bright red having a high saturation can be fully utilized, while at the same time solving the problem of hue displacement in displaying red having an intermediate saturation.

DESCRIPTION OF SYMBOLS

Figure 1:
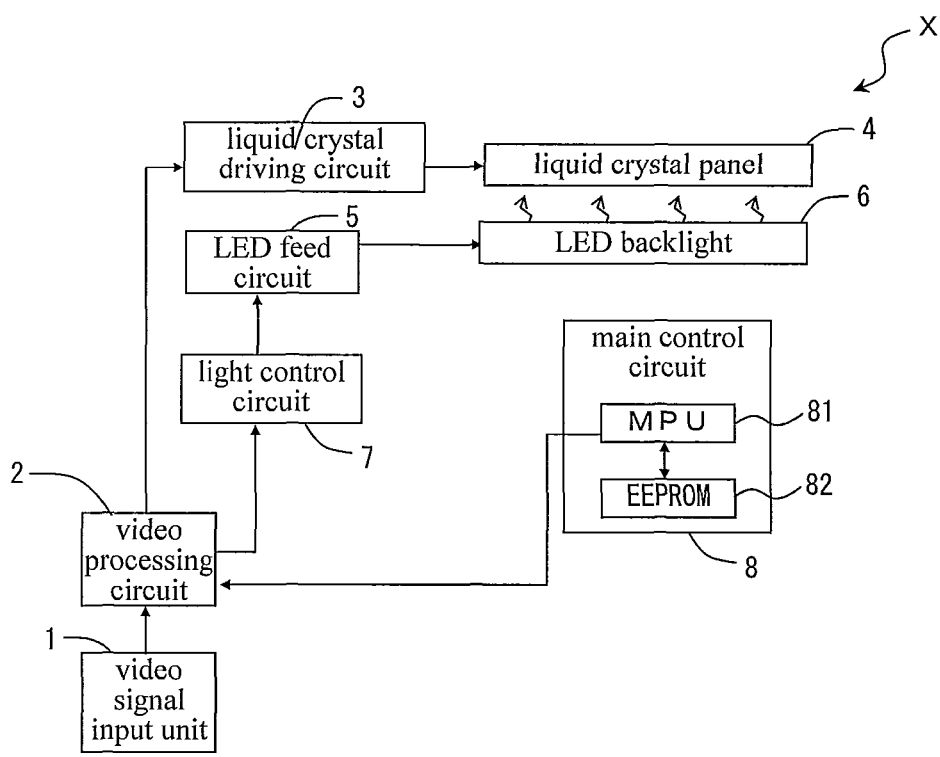
FIG. 1 is a block diagram showing a general structure of a liquid crystal display device X as an example of a video display device according to an embodiment of the present invention.

X . . . liquid crystal display device
1 . . . video signal input unit
2 . . . video processing circuit
3 . . . liquid crystal driving circuit
4 . . . liquid crystal panel
5 . . . LED feed circuit
6 . . . LED backlight
7 . . . light control circuit
8 . . . main control circuit
81 . . . MPU
82 . . . EEPROM
Ax . . . correction target color range
Ay . . . red hue reference range

BEST MODE FOR CARRYING OUT THE INVENTION

Further features and advantages of the present invention will become more readily apparent from the following detailed description when taken in conjunction with the accompanying drawings. Additionally, the following embodiment is merely an example of the present invention which should not limit the technical scope of the present invention.

Figure 2:
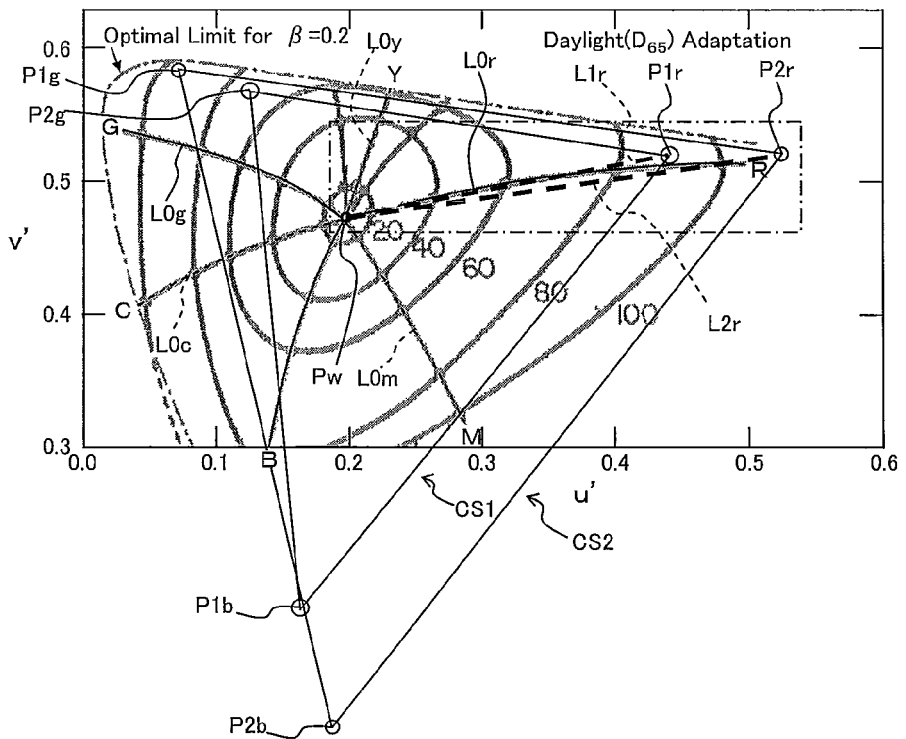
FIG. 2 is a view showing a color reproduction range displayable on a standard color gamut display and a color reproduction range displayable on a wide color gamut display on a u' v' chromaticity diagram, when conducting video display based on a video signal conforming to the sRGB standard.
Figure 3:
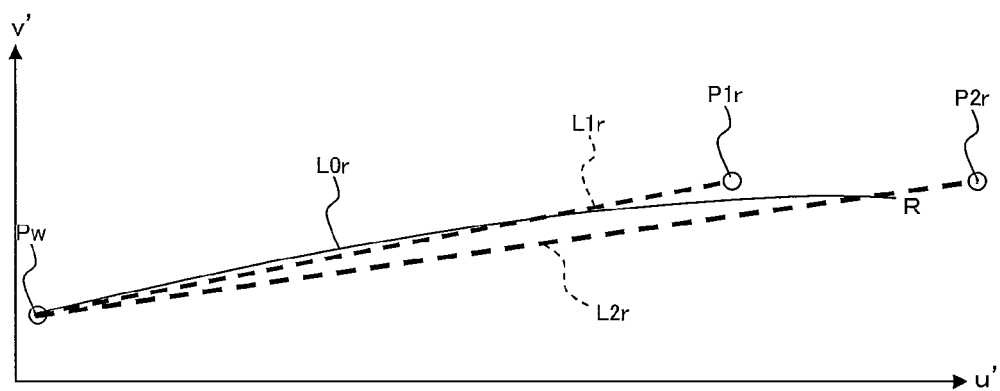
FIG. 3 is an expanded view showing equal hue lines of red in a standard color reproduction range and an expanded color reproduction range respectively and a visually equal hue line of red.
Figure 4:
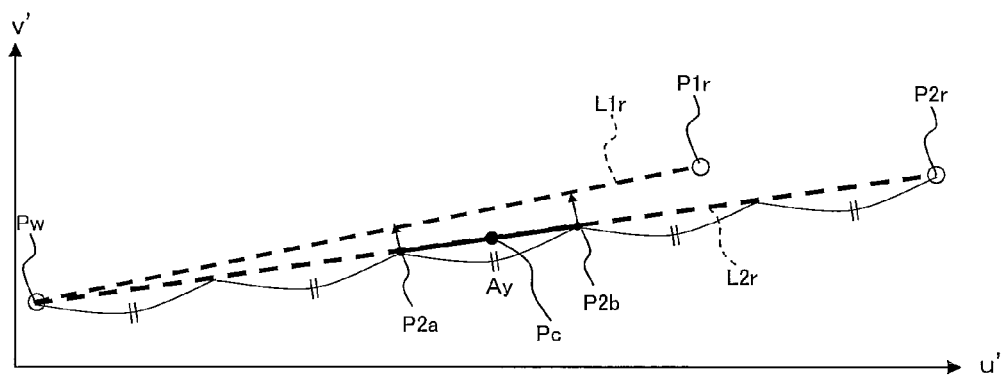
FIG. 4 is a view showing a first example of a red hue reference range as a hue correction target in a liquid crystal display device X on an u' v' coordinate system.
Figure 5:
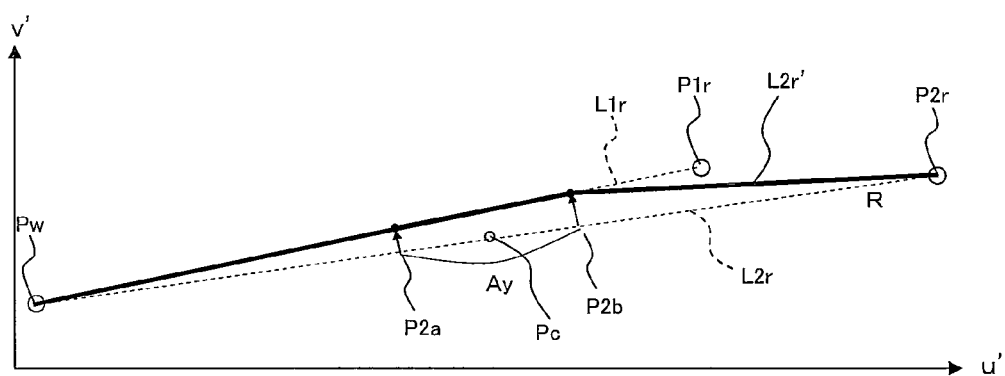
FIG. 5 is a view showing a first example of a hue change generated by a hue correction in a liquid crystal display device X on an u' v' coordinate system.
Figure 6:
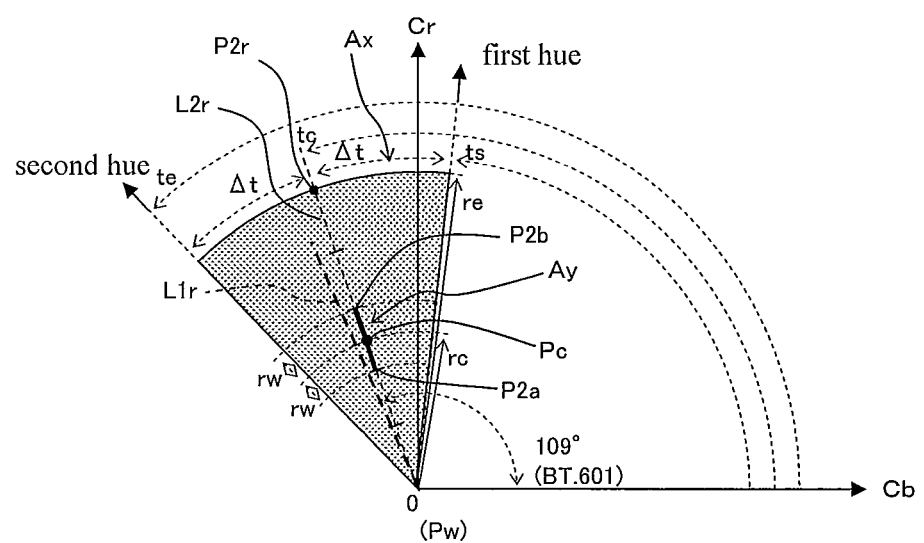
FIG. 6 shows a first example of a correction target color range as a hue correction target in a liquid crystal display device X viewed from a direction orthogonal to a Y-axis on a Ycbcr coordinate system.
Figure 7:
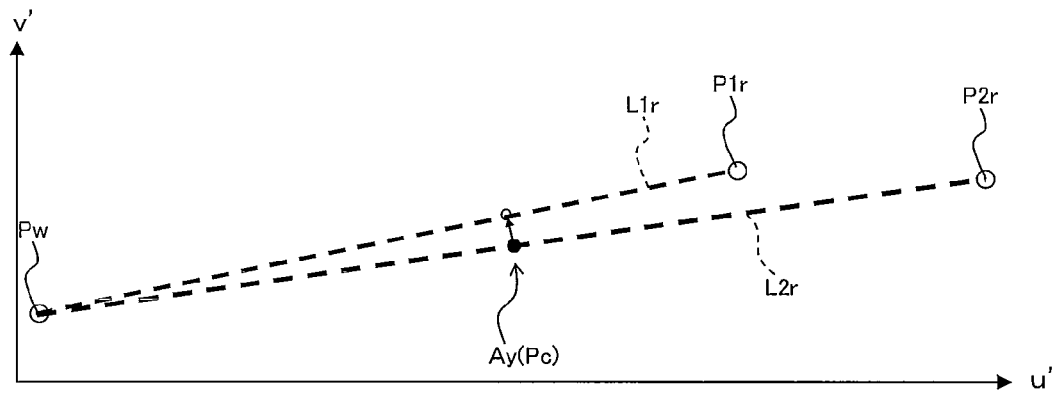
FIG. 7 is a view showing a second example of a red hue reference range as a hue correction target in a liquid crystal display device X on an u' v' coordinate system.
Figure 8:
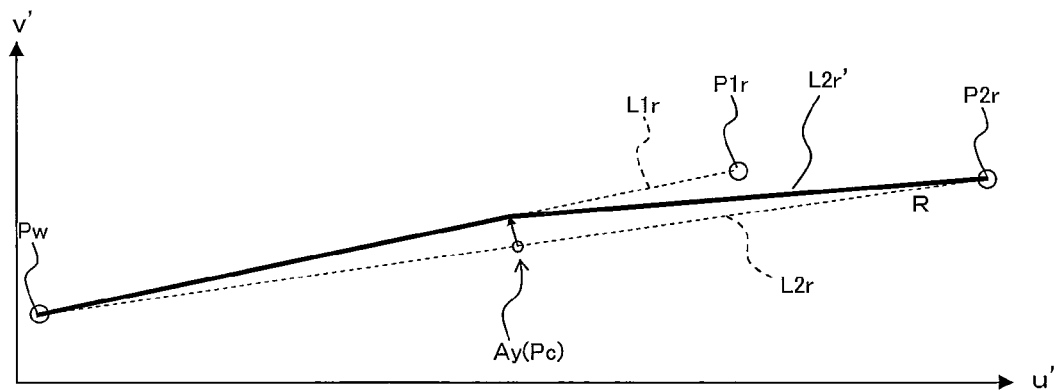
FIG. 8 is a view showing a second example of a hue change generated by a hue correction in a liquid crystal display device X on an u' v' coordinate system.
Figure 9:
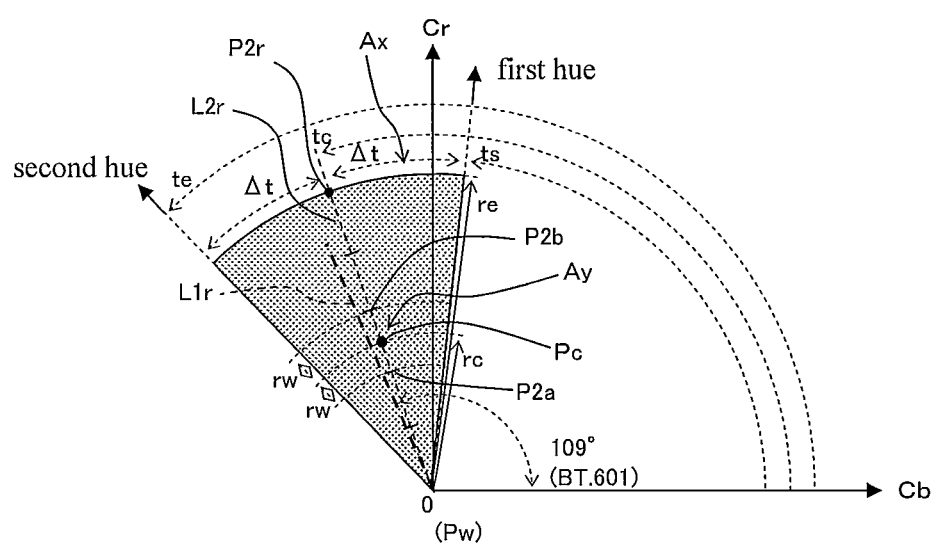
FIG. 9 shows a second example of a correction target color range as a hue correction target in a liquid crystal display device X viewed from a direction orthogonal to a Y-axis on a Ycbcr coordinate system.

Here, FIG. 1 is a block diagram showing a general structure of a liquid crystal display device X as an example of a video display device according to an embodiment of the present invention; FIG. 2 is a view showing a color reproduction range displayable on a standard color gamut display and the one displayable on a wide color gamut display on a u' v' chromaticity diagram when conducting video display based on a video signal conforming to the sRGB standard; FIG. 3 is an expanded view showing equal hue lines of red in a standard color reproduction range and an expanded color reproduction range respectively and a visually equal hue line of red; FIG. 4 is a view showing a first example of a red hue reference range as a hue correction target in a liquid crystal display device X on an u' v' coordinate system; FIG. 5 is a view showing a first example of a hue change generated by a hue correction in a liquid crystal display device X on an u' v' coordinate system; FIG. 6 shows a first example of a correction target color range as a hue correction target in a liquid crystal display device X viewed from a direction orthogonal to a Y-axis on a Ycbcr coordinate system; FIG. 7 is a view showing a second example of a red hue reference range as a hue correction target in a liquid crystal display device X on an u' v' coordinate system; FIG. 8 is a view showing a second example of a hue change generated by a hue correction in a liquid crystal display device X on an u' v' coordinate system; FIG. 9 shows a second example of a correction target color range as a hue correction target in a liquid crystal display device X viewed from a direction orthogonal to a Y-axis on a Ycbcr coordinate system.

Firstly, the configuration of a liquid crystal display device X as an example of a video display device according to an embodiment of the present invention is described with reference to a block diagram shown in FIG. 1.

As can be seen from FIG. 1, the liquid crystal display device X includes a video signal input unit 1, a video processing circuit 2, a liquid crystal driving circuit 3, a liquid crystal panel 4, an LED feed circuit 5, an LED backlight 6, a light control circuit 7, and a main control circuit 8, and the like.

The LED backlight 6 having an LED as a light source illuminates the liquid crystal panel 4 The LEDs are aligned on the rear surface side of the liquid crystal panel 4 displaying video, being a light source constituted by a white LED or LEDs of three RGB colors (three LEDs).

The liquid crystal panel 4 illuminated by the LED backlight 6 is an example of a wide color gamut display for, when the input video signal conforming to the sRGB standard is input to the liquid crystal driving circuit 3 through the video signal input unit 1 and the video processing circuit 2, displaying video in colors in the expanded color reproduction range CS2 wider than the color reproduction range of the sRGB standard (the standard color reproduction range CS1 in FIG. 2). In addition, a backlight having a light source other than an LED may be employed.

The video signal input unit 1 is an interface for inputting a video signal. Hereinafter, a video signal input through the video signal input unit 1 is referred to as "input video signal".

The video processing circuit 2 executes various signal processing based on the input video signal.

For example, the video processing circuit 2 corrects a signal value of the input video signal in accordance with a command from the main control circuit 8.

In particular, upon receiving a command for operating in the later-described "standard mode" from the main control circuit 8, the video processing circuit 2 conducts color gamut compression to the input video signal. This color gamut compression processing is, as can be seen from, for example, the Patent literature 1, for correcting the input video signal, so that the display colors of the liquid crystal panel 4 (wide color gamut display) fall in from the color range of the expanded color reproduction range CS2 to the color range of the standard color reproduction range CS1. This allows the video based on the input video signal conforming to the sRGB standard to be displayed on the liquid crystal panel 4 in colors nearly the same as the display colors on the conventional standard color gamut display. The particular details of the color gamut compression processing are omitted here in the description.

In addition, upon receiving a command for operating in the later-described "bright mode" from the main control circuit 8, the video processing circuit 2 executes hue correction processing for correcting the hue of a color indicated by the input video signal by correcting a signal value of the input video signal. The details of the hue correction processing are described later.

In addition, the video processing circuit 2 sequentially generates a frame signal showing a video luminance (pixel gradation) of each primary color (R, G, and B) in each pixel that constitutes image of one frame in a moving image, based on the input video signal for one frame or the display target video signal for one frame as a signal obtained by conducting the hue correction processing to the input video signal, and sends the frame signal to the liquid crystal driving circuit 3.

Additionally, every time when the input video signal for one frame is input, the video processing circuit 2 calculates a average luminance level (so called, APL: Average Picture Level), regarding the input video signal as a reference value of the video luminance (gradation level) in the display target video signal, and sends the calculated result to the light control circuit 7. The average luminance level is a weighted average value of a video luminance (gradation level) of each primary color (R, G, and B) in each pixel in the display target video signal for one frame.

The liquid crystal driving circuit 3, based on the frame signal sequentially transmitted from the video processing circuit 2 in a prescribed cycle, sequentially displays a video for one frame (image in one frame) corresponding to the frame signal on the liquid crystal panel 4.

More particularly, the liquid crystal driving circuit 3 supplies a gradation signal having a voltage (gradation voltage) in accordance with a gradation level (may be called a luminance level) of each primary color (R, G, and B) to a liquid crystal element in each pixel provided on the liquid crystal display panel. This allows the liquid crystal panel 4 to display a video (moving image) based on the input video signal.

The light control circuit 7 determines a luminance of each LED in the LED backlight 6, based on the average luminance level found (calculated) by the video processing circuit 2. Furthermore, the light control circuit 7 decides a control value (for example, a duty ratio in a PWM control) of a supplying voltage for each LED in the LED backlight 6 in accordance with the determined luminance, and sets (outputs) the control value to the LED feed circuit 5.

The LED feed circuit 5 supplies electrical power in accordance with the control value set by the light control circuit 7 to each LED in the LED backlight 6. This adjusts the luminance of the LED backlight 6 to the luminance determined by the light control circuit 7.

Additionally, the video processing circuit 2 and the light control circuit 7 are embodied by, for example, a FPGA and an ASIC, and the like.

The LED feed circuit 5 adjusts supplying power for each LED in the LED backlight 6 according to a control command from the light control circuit 7. For example, the LED feed circuit 5 adjusts the supplying power for each LED by the PWM control. Or, the LED feed circuit 5 may conduct the light control of each LED by adjusting the DC voltage level.

The main control circuit 8 comprises a MPU 81 as calculating means and an EEPROM 82 as a nonvolatile memory, and the MPU 81 executes control programs stored in a ROM not shown, so as to execute control processing of each component in the liquid crystal display device X.

For example, in the main control circuit 8, the MPU 81 conducts switching processing of video display modes in accordance with an operation input through a remote operator not shown. Here, the video display mode is an operating mode of the video processing circuit 2.

More particularly, the MPU 81 conducts the switching processing between a standard mode and a bright mode as the two video display modes in accordance with an operation input. Then, a command for operating in the switched video display mode is output from the MPU 81 to the video processing circuit 2.

In the standard mode, the color gamut compression processing is provided to the input video signal conforming to the sRGB standard, so that the display colors on the liquid crystal panel 4 (wide color gamut display) fall in from the color range of the expanded color reproduction range CS2 to the color range of the standard color reproduction range CS1 shown in FIG. 2.

On the other hand, in the bright mode, the hue correction processing is executed for correcting the hue of a color indicated by the input video signal. In this mode, by correcting a signal value of the input video signal conforming to the sRGB standard, the color deviation in reddish colors having intermediate saturations in the expanded color reproduction range CS2 is resolved.

Next, in reference to FIGS. 4 to 6, the hue correction processing executed in the bright mode is described. FIGS. 4 and 5 show color ranges in chromaticity diagrams u' v', and FIG. 6 shows a color range in a Ycbcr coordinate system (Ycbcr color space). An u'-v' plane in the u' v' chromaticity diagram corresponds to a Cb-Cr plane in the Ycbcr coordinate system. Additionally, FIGS. 6 and 9 show video signals conforming to BT.601 standard of the International Telecommunication Union (ITU).

The video processing circuit 2 conducts the hue correction processing, based on a portion (hereinafter, referred to as a red hue reference range Ay) having a saturation of a central prescribed range in the color range of an equal hue from achromatic colors having the lowest saturation (the colors in the position Pw in FIGS. 4 to 6) to red having a highest saturation (the color of the position P2y in FIGS. 4 to 6) in the expanded color reproduction range.

In addition, the hue correction processing target of the video processing circuit 2 is a signal value of the input video signal indicating colors in a range (hereinafter, referred to as "correction target color range Ax") partly including the red hue reference range Ay but not including achromatic colors having the lowest saturation and red having the highest saturation in the expanded color reproduction range CS 2.

Recorded preliminarily in the EEPROM 82 in the control circuit 8 are correction target color range identifying information d1 as information for identifying the correction target color range Ax and correction target color range identifying information d2 as information for identifying the red hue reference range Ay included within the correction target color range Ax.

As shown in FIG. 4, the red hue reference range Ay is a central portion having a saturation in a prescribed range in the color range of an equal hue from achromatic colors (the colors in the position Pw) having the lowest saturation to red having the highest saturation (the color in the position P2r) in the expanded color reproduction range CS2. The red hue reference range Ay includes colors (the colors in the position Pc) in a portion of a saturation r c in a center point in the color range of an equal hue from achromatic colors (the colors in the position Pw) having the lowest saturation to red having the highest saturation (the color in the position P2r) in the expanded color reproduction range CS2.

In FIG. 6, the red hue reference range Ay is shown as a range in the color range of a red equal hue ranging, based on a central saturation part Pc as a center part having a saturation re, from a color having the saturation lower for −rw to a color having the saturation higher for +rw. Additionally, a width rw of the saturation is a predetermined invariable.

In other words, the lowest saturation in the red hue reference range Ay is rs0=rc−rw, while the highest saturation in the same is re0=rc+rw.

For example, the red hue reference range Ay is a range of a portion accounting for one fifth of the saturation in the center in the color range of an equal hue from achromatic colors (the colors in the position Pw) having the lowest saturation to red (the color in the position P2r) having the highest saturation in the expanded color reproduction range CS2 (the central division in the color range of the equal hue equally divided into five in the saturation direction). In this case, the width rw of the saturation is one tenth of the full scale saturation.

The red hue reference range Ay shown in FIG. 4 is merely an example, and its width in the saturation direction may be wider or narrower.

Additionally, as shown in FIG. 6, the correction target color range Ax partly including the red hue reference range Ay is a hue range inside (not including the border line) of the range from a first hue (the hue having an angle is of the polar coordinate in the plane Cb-Cr) in the side closer to blue (or, may be said as the side closer to magenta) rather than red hue to a second hue (the hue having an angle to of the polar coordinate in the plane Cb-Cr) in the side closer to yellow rather than red hue.

And also, the angular difference Δt of the polar coordinate of the first hue and the second hue against the red hue (the hue in the Cr-axis direction) is set to be the same.

The saturation range and the luminance range in the correction target color range Ax are the range subtracting achromatic colors having the lowest saturation (the colors in the position Pw) and red having the highest saturation (the color in the position P2r) from the entire range of values the saturation and the luminance may take respectively.

Hereinafter, a concrete example of the hue correction processing of the video processing circuit 2 is described.

Firstly, the video processing circuit 2 calculates polar coordinates (r in, t in) for identifying the saturation and hue on the Cb-Cr plane of the input video signal, based on the values Cb and Cr of the input video signal (Cb in, Cr in). The polar coordinates (r in, t in) can be calculated based on the known Cordic (Coordinate Rotation Digital Computer) algorithm.

Next, the video processing circuit 2, based on the next formula (A1), calculates deviations (Δr in, Δt in) of the colors (r in, t in) of the input video signal in the expanded color reproduction range CS2 against the red hue reference range Ay.

⟨Formula 1⟩

$$\left. \begin{array}{ll} \text{If } r \text{ in} < r \text{ s0} & \text{Then } \Delta r \text{ in} = rs0 - r \text{ in} \\ \text{If } r \text{ in} > r \text{ e0} & \text{Then } \Delta r \text{ in} = r \text{ in} - r \text{ e0} \\ \text{Else} & \Delta r \text{ in} = 0 \\ \text{If } -0.5 \leq (tc - t \text{ in}) \leq 0.5 & \text{Then } \Delta t \text{ in} = |tc - t \text{ in}| \\ \text{Else} & \Delta t \text{ in} = 1.0 - |tc - t \text{ in}| \end{array} \right\} \quad (A1)$$

In the formula (A1),

Δr in: a deviation of a saturation of the input video signal against colors in the red hue reference range Δt in: a deviation of a hue of the input video signal against colors in the red hue reference range r in: a polar coordinate of a saturation of the input video signal on the plane Cb-Cr t in: a polar coordinate of a hue of the input video signal on the plane Cb-Cr rs0: a polar coordinate of the lowest saturation in the red hue reference range on the plane Cb-Cr re0: a polar coordinate of the highest saturation in the red hue reference range on the plane Cb-Cr tc: a polar coordinate of a hue in the red hue reference range on the plane Cb-Cr In addition, the video processing circuit 2 calculates a weight coefficient Wrt of the hue correction, based on the next formula (A2).

⟨Formula 2⟩

$$Wrt = [1.0-(\Delta rin/\Delta rmax)] \times [1.0-(\Delta tin/\Delta tmax)] \quad (A2)$$

In the formula (A2),

Wrt: a weight coefficient of hue correction

Δr in: a deviation of a saturation of the input video signal against colors in the red hue reference range Δt in: a deviation of a hue of the input video signal against colors in the red hue reference range Δr max: the maximum value Δr in could take Δt max: the maximum value Δt in could take Then, the video processing circuit 2 calculates values Cb and Cr (Cb out, Cr out) after the hue correction of the input video signal, based on the next formula (A3).

⟨Formula 3⟩

$$\left. \begin{array}{l} Cb \text{ out} = [Cb \text{ in} \times \cos(Wrt \times k \text{ hue})] - [Cr \text{ in} \times \sin(Wrt \times k \text{ hue})] \\ Cr \text{ out} = [Cb \text{ in} \times \sin(Wrt \times k \text{ hue})] + [Cr \text{ in} \times \cos(Wrt \times k \text{ hue})] \end{array} \right\} \quad (A3)$$

In the formula (A3),

Cb in: Cb value of the input video signal

Cr in: Cr value of the input video signal

Cb out: Cb value after hue correction processing

Cr out: Cr value after hue correction processing

Wrt: a weight coefficient of hue correction k hue: a compensation coefficient of a previously set hue (correction angle from the red hue in an expanded color space to the red hue in a standard color space)

With the hue correction based on the formulae (A1) to (A3), a signal value of the input video signal showing colors in the correction target color range Ax partly including the red hue reference range Ay is corrected, so that the hue of the signal value may change to a hue akin to yellow in the expanded color reproduction range CS2. In short, a signal value of the input video signal showing colors in the correction target color range Ax is corrected, so that the hue shifts in the clockwise direction viewed from the Y-axis direction in the Ycbcr color reproduction range.

Also, in the hue correction, a signal value is corrected, so that the hue in the red hue reference range Ay may change into a hue (the hue of the equal hue line L1r) ranging from achromatic colors having the lowest saturation (the position of the point Pw) to red having the highest saturation (the position of the point P1r) on the equal hue line of red in the color reproduction range conforming to the sRGB standard (the standard color reproduction range CS1).

This allows the display color of red having an intermediate saturation on the liquid crystal panel 4 (wide color gamut display) to resemble to a display color of red having an intermediate saturation on a conventional and ordinary standard color gamut display, in short, a color on the visually equal hue line of red (the line L0r in FIGS. 2 and 3), thereby resolving the hue displacement problem.

Additionally, with the hue correction of the input video signal based on the formulae (A1) to (A3), a signal value of red having the highest saturation in the expanded color reproduction range CS2 (the color in the position Pr2) is not corrected.

Furthermore, with the weight coefficient Wrt of the hue correction based on the formula (A2), the hue change ratio into a hue akin to yellow may be smaller in a color having a long distance from the red hue reference range Ay in the expanded color reproduction range CS2 than a color having a distance close thereto. Therefore, before/after the signal value correction, the color continuity (gradation) can be ensured, while bright red having a high saturation is displayed as it is without receiving the color gamut compression. As a result, the liquid crystal panel 4 in the LED backlight system as a wide color gamut display that is displayable of bright red having a high saturation can be fully utilized.

The red hue reference range Ay in the above mentioned embodiment is a color range having a prescribed width (2×rw) of the saturation.

In response, an embodiment (hereinafter, referred to as the second example) may be suggested wherein the red hue reference range Ay may not have a width of the saturation.

FIG. 7 is a view showing the second example of the red hue reference range Ay as a hue correction target on an u' v' coordinate system. FIG. 8 is a view showing the second example of a hue change generated by the hue correction on an u' v' coordinate system. FIG. 9 shows the second example of the correction target color range as a hue correction target viewed from a direction orthogonal to a Y-axis on a Ycbcr coordinate system.

In the second example shown in FIGS. 7 to 9, the red hue reference range Ay is a portion Pc having the saturation r c of a center point in the color range of an equal hue from achromatic colors (the colors of the position Pw in FIGS. 7 to 9) having the lowest saturation to red having a highest saturation (the color of the position P2y in FIGS. 7 to 9) in the expanded color reproduction range CS2.

In FIG. 9, the red hue reference range Ay is illustrated as a point, however, it is actually a color range having a prescribed range in the luminance direction (Y-axis direction).

In the example 2, the video processing circuit 2 conducts the hue correction processing in a way, for example, as follows.

As in the above embodiment, the video processing circuit 2 firstly calculates polar coordinates (r in, t in) for identifying the saturation and hue on the Cb-Cr plane of the input video signal, based on the values Cb and Cr of the input video signal (Cb in, Cr in).

Next, the video processing circuit 2 calculates, based on the next formula (B1), deviations (Δr in, Δt in) of a color (r in, t in) of the input video signal in the expanded color reproduction range CS2 against the red hue reference range Ay.

⟨Formula 4⟩

$$\left.\begin{array}{l}\Delta r\ in = |rc - r\ in| \\ \text{If} -0.5 \leq (tc - t\ in) \leq 0.5 \quad \text{Then } \Delta t\ in = |tc - t\ in| \\ \text{Else} \qquad\qquad\qquad\qquad \Delta t\ in = 1.0 - |tc - t\ in|\end{array}\right\} \quad (B1)$$

In the formula (B1),
Δr in: a deviation of a saturation of the input video signal against colors in the red hue reference range
Δt in: a deviation of a hue of the input video signal against colors in the red hue reference range
r in: a polar coordinate of a saturation of the input video signal on the plane Cb-Cr
t in: a polar coordinate of a hue of the input video signal on the plane Cb-Cr
rc: a polar coordinate of a saturation in the red hue reference range on the plane Cb-Cr
tc: a polar coordinate of a hue in the red hue reference range on the plane Cb-Cr In addition, the video processing circuit 2 calculates a weight coefficient Wrt of the hue correction, by applying the deviations (Δr in, Δt in) calculated based on the formula (A1) to the formula (A2).

Then, the video processing circuit 2 calculates values Cb and Cr (Cb out, Cr out) after the hue correction of the input video signal, based on the formula (A3).

With the hue correction based on the above formulae (B1), (A2), and (A3), the effect same as the above-mentioned embodiment can be achieved.

The present invention is applicable to a video display device.

What is claimed is:

1. A video display device with a wide color gamut display having an expanded color reproduction range as a color reproduction range wider than the color reproduction range of the sRGB standard, and correcting an input video signal conforming to a standard having a color reproduction range narrower than the expanded color reproduction range and inputting the input video signal to the wide color gamut display,
the video display device comprising:
a correcting portion configured to correct a signal value of the input video signal showing a color in a predetermined correction target color range, partly including a red hue reference range as a saturation portion of a center point in a color range of an equal hue ranging from achromatic colors having the lowest saturation to red having the highest saturation in the expanded color reproduction range, but not including red having the highest saturation in the expanded color reproduction range, so that the hue of the signal value changes to a hue between yellow and red in the expanded color reproduction range,
wherein, in doing so, the correcting portion corrects the signal value, without correcting red having the highest saturation in the expanded color reproduction range, so that the hue of the red hue reference range is changed into a hue within a range ranging from achromatic colors having the lowest saturation in the color reproduction range of a standard to which the input video signal conforms to the red hue having the highest saturation, and so that the hue change into the changed hue between yellow and red is smaller for an input color which is a longer distance from the red hue reference range in the expanded color reproduction range than an input color which is closer to the red hue reference range.

2. The video display device according to claim 1, wherein the wide color gamut display is a liquid crystal panel illuminated by a backlight having an LED as a light source.

3. The video display device according to claim 1, wherein the red hue reference range is a range of a saturation accounting for nearly one fifth of the center in the color range of an equal hue from achromatic colors having the lowest saturation to red having the highest saturation in the expanded color reproduction range.

4. The video display device according to claim 2, wherein the red hue reference range is a range of a saturation accounting for nearly one fifth of the center in the color range of an equal hue from achromatic colors having the lowest saturation to red having the highest saturation in the expanded color reproduction range.

* * * * *